(12) United States Patent
McNeill et al.

(10) Patent No.: US 7,987,105 B2
(45) Date of Patent: Jul. 26, 2011

(54) TRAFFIC BASED LABOR ALLOCATION METHOD AND SYSTEM

(75) Inventors: Dave McNeill, Chicago, IL (US); Jim Martin, Grayslake, IL (US); Paige Stover, Chicago, IL (US); Gary Dispensa, Naperville, IL (US); Ian Harris, Chicago, IL (US); Eric Guanlao, Chicago, IL (US); Anurag Pande, Chicago, IL (US)

(73) Assignee: ShopperTrak RCT Corporation, Chicago, IL (US)

( * ) Notice: Subject to any disclaimer, the term of this patent is extended or adjusted under 35 U.S.C. 154(b) by 1192 days.

(21) Appl. No.: 11/623,229

(22) Filed: Jan. 15, 2007

(65) Prior Publication Data
US 2008/0172282 A1 Jul. 17, 2008

(51) Int. Cl.
*G06F 17/60* (2006.01)
(52) U.S. Cl. .......................................................... 705/7
(58) Field of Classification Search ....................... 705/7
See application file for complete search history.

(56) References Cited

U.S. PATENT DOCUMENTS

| | | | | |
|---|---|---|---|---|
| 4,700,295 | A * | 10/1987 | Katsof et al. | 705/10 |
| 5,465,115 | A * | 11/1995 | Conrad et al. | 348/155 |
| 5,491,629 | A * | 2/1996 | Fox et al. | 702/3 |
| 5,634,055 | A * | 5/1997 | Barnewall et al. | 1/1 |
| 5,712,985 | A * | 1/1998 | Lee et al. | 705/7 |
| 5,911,134 | A | 6/1999 | Castonguay et al. | |
| 6,628,777 | B1 * | 9/2003 | McIllwaine et al. | 379/265.01 |
| 6,697,104 | B1 * | 2/2004 | Yakobi et al. | 348/143 |
| 6,742,002 | B2 | 5/2004 | Arrowood | |
| 6,788,202 | B2 * | 9/2004 | Holmes et al. | 340/541 |
| 6,823,315 | B1 | 11/2004 | Bucci et al. | |
| 7,103,562 | B2 * | 9/2006 | Kosiba et al. | 705/10 |
| 7,103,652 | B1 * | 9/2006 | Dobberpuhl et al. | 709/223 |
| 7,222,082 | B1 * | 5/2007 | Adhikari et al. | 705/8 |
| 7,415,510 | B1 * | 8/2008 | Kramerich et al. | 709/219 |

(Continued)

FOREIGN PATENT DOCUMENTS

EP 2122463 11/2009

(Continued)

OTHER PUBLICATIONS

Shoppertrack helps keep Nordictrack on track Cahin Store Age, vol. 72, No. 2, Feb. 1996.*

(Continued)

*Primary Examiner* — Scott L Jarrett
(74) *Attorney, Agent, or Firm* — Neal, Gerber & Eisenberg LLP

(57) ABSTRACT

A method and system for distributing labor based upon determinations of traffic in a facility, such as a store. Daily traffic forecast information is obtained for each day within a given time period from a source of such information. Calendar and event information for the facility for each day within the given time period is determined. Baseline days are selected from historical traffic data, and baseline averages and percentages for a predetermined time interval are also selected. The distribution of traffic for each day within the given time period at each time interval is determined using the baseline percentages for each time interval. Labor data is distributed. Labor recommendations are provided at each time interval for the given time period based on the distribution of traffic for each day, and at least one of other user-defined workforce requirements. The results of any or all the these steps are displayed to a user.

29 Claims, 14 Drawing Sheets

U.S. PATENT DOCUMENTS

| | | | |
|---|---|---|---|
| 7,533,036 B2 * | 5/2009 | Bamberg et al. | 705/10 |
| 7,539,627 B2 * | 5/2009 | Schmidt | 705/9 |
| 7,612,796 B2 * | 11/2009 | Lev-Ran et al. | 348/143 |
| 2001/0014868 A1 * | 8/2001 | Herz et al. | 705/14 |
| 2002/0184069 A1 * | 12/2002 | Kosiba et al. | 705/8 |
| 2003/0055706 A1 | 3/2003 | Statfeld | |
| 2004/0010437 A1 * | 1/2004 | Kiran et al. | 705/8 |
| 2004/0078257 A1 * | 4/2004 | Schweitzer et al. | 705/9 |
| 2004/0098296 A1 * | 5/2004 | Bamberg et al. | 705/10 |
| 2004/0225521 A1 | 11/2004 | Acosta | |
| 2005/0283393 A1 * | 12/2005 | White et al. | 705/8 |
| 2006/0031110 A1 | 2/2006 | Benbassat et al. | |
| 2006/0047551 A1 * | 3/2006 | Cotten et al. | 705/8 |
| 2007/0021999 A1 * | 1/2007 | Whalen et al. | 705/10 |
| 2008/0154673 A1 * | 6/2008 | Connolly et al. | 705/7 |

FOREIGN PATENT DOCUMENTS

WO     WO 2009/004479 A3     1/2009

OTHER PUBLICATIONS

Shoppertrak.com Web Pages Shoppertrack, Feb. 2001, Retrieved from Archive.org Jun. 2, 2010.*

Discovery Channel Discovers Opportunities with Accurate Traffic Count Data Stores.org, Dec. 2002.*

Shoppertrak.com Web Pages Shoppertrack, 2003, Retrieved from Archive.org Jun. 2, 2010.*

Workbrain Announces New Retail Scheduling Capabilities in Expanded Workbrain for Retail Suite Business Wire, Jun. 10, 2003.*

Intelligent Scheduling Chain Store Age, vol. 72, No. 10, Oct. 1996.* eRestaurant Services—Workforce Management Suite—brochure Altametrics, Inc. 2004.*

High-Tech Staff Scheduling for Banks HR Banker, Mar. 1998.*

Kronos Smart Scheduler Brochure Krons, 1999, Retrieved from Archive.org.*

Pipkins.com Web Pages—Maxmia Advantage Pipkins, May 1998, Retrieved from Archive.org Oct. 10, 2006.*

Thompson, Gary M., A Simulated Annealing Heuristic for Shift Scheduling Using Non-Continuously Available Employees Computers Operatins Research, vol. 23, No. 3, 1996.*

Lam, Shunyin et al., Retail Sales Force Scheduling Based on Store Traffic Forecasting Journal of Retailing, vol. 74, No. 1, 1998.*

Francella, Barbara Grondin, Managing Labor Convenience Store News, Vo. 35, No. 9, Jul. 12, 1999.*

Garf, Robert et al., Store Traffic Adds a New Level of Consumer Insight for Retailers AMR Research—Alert Highlight, Apr. 28, 2004.*

Hennessy, Terry, Scheduling That Works Progressive Grocer, vol. 72, No. 12, Dec. 1993.*

Lee, Wing Yee et al., Providing support for the user of analogies in demand forecasting tasks University of Bath—School of Management, 2005.*

Frontline Labor Management—Kronos Smart Scheduler (Product Brochure and Web Pages) Kronos, Mar. 2000, Retrieved from Archive.org Jan. 10, 2006.*

ScheduleSoft.com Web Pages—ScheduleSoft Personnel Scheduling Software Schedule Soft, Mar. 2000, Retrieved from Archive.org Jan. 31, 2006.*

Adaptiv.com Wed Pages (WorkFORCE97—product pages) Dec. 1997, Retrieved from Archive.org Jun. 23, 2005.*

PrimeTime F&S User's Guide—Version 1.3 Blue Pumpkin Software, Inc., 1997-1998.*

"A Simulated-Annealing Heuristic for Shift Scheduling Using Non-Continuously Available Employees" by Gary M. Thompson, pp. 275-288.

Computers Ops. Res. vol. 23, No. 3, 1996 ; Elsevier Science Ltd. Printed in Great Britain; Pergamon.

"Beyond POS-Two Technologies That Can Significantly Increase Sales and Profits-An Examination of Technologies for Retailers That Go Beyond Traditional POS, Merchandising, Customer Profiling and Financial Software" (Microsoft Whitepaper) May 2003.

International Search Report dated May 20, 2008.

Canadian pending Patent Application No. 2675389, filed on Jan. 14, 2008.

* cited by examiner

FIG. 6

ShopperTrak

| RTA | Support | Admin | ESP |

Log out | Help

Dave Mcneill-Demo Company

ShopperTrak

Performance
Scheduling
Power Hours
/Administration/
  Payroll Hours
  Min/Max Coverage
  Store Hours
  Org. Preferences
  Store Preferences
  My Preferences Corporate-Reporting Hierarchy    Min/Max Coverage ◁▷ Week Ending: 12/10/2005  🔲 —58

Store No.: 104-Deer Park ▽ Go

| | Sunday 12/04/2005 | Monday 12/05/2005 | Tuesday 12/06/2005 | Wednesday 12/07/2005 | Thursday 12/08/2005 | Friday 12/09/2005 | Saturday 12/10/2005 |
|---|---|---|---|---|---|---|---|
| 11:00 | CLOSED | CLOSED | CLOSED | CLOSED | CLOSED | CLOSED | CLOSED |
| 11:30 | 2 \| 18 | 2 \| 18 | 2 \| 18 | 2 \| 18 | 2 \| 18 | 2 \| 18 | 2 \| 18 |
| 12:00 | 2 \| 18 | 2 \| 18 | 2 \| 18 | 2 \| 18 | 2 \| 18 | 2 \| 18 | 2 \| 18 |
| 12:30 | 2 \| 18 | 2 \| 18 | 2 \| 18 | 2 \| 18 | 2 \| 18 | 2 \| 18 | 2 \| 18 |
| 13:00 | 2 \| 18 | 2 \| 18 | 2 \| 18 | 2 \| 18 | 2 \| 18 | 2 \| 18 | 2 \| 18 |
| 13:30 | 2 \| 18 | 2 \| 18 | 2 \| 18 | 2 \| 18 | 2 \| 18 | 2 \| 18 | 2 \| 18 |
| 14:00 | 2 \| 18 | 2 \| 18 | 2 \| 18 | 2 \| 18 | 2 \| 18 | 2 \| 18 | 2 \| 18 |
| 14:30 | 2 \| 18 | 2 \| 18 | 2 \| 18 | 2 \| 18 | 2 \| 18 | 2 \| 18 | 2 \| 18 |
| 15:00 | 2 \| 18 | 2 \| 18 | 2 \| 18 | 2 \| 18 | 2 \| 18 | 2 \| 18 | 2 \| 18 |
| 15:30 | 2 \| 18 | 2 \| 18 | 2 \| 18 | 2 \| 18 | 2 \| 18 | 2 \| 18 | 2 \| 18 |
| 16:00 | 2 \| 18 | 2 \| 18 | 2 \| 18 | 2 \| 18 | 2 \| 18 | 2 \| 18 | 2 \| 18 |
| 16:30 | 2 \| 18 | 2 \| 18 | 2 \| 18 | 2 \| 18 | 2 \| 18 | 2 \| 18 | 2 \| 18 |
| 17:00 | 2 \| 18 | 2 \| 18 | 2 \| 18 | 2 \| 18 | 2 \| 18 | 2 \| 18 | 2 \| 18 |
| 17:30 | CLOSED | CLOSED | CLOSED | CLOSED | CLOSED | CLOSED | CLOSED |

Load Template | Save As Template | Apply Changes | Cancel

—36      —24    —38    —26

Powered by ShopperTrak

? Need help with this page? CLICK HERE. Privacy Policy | Terms of Use

FIG. 7

FIG. 9

Dave Mcneill-Demo Company

Staffing Performance 11/25/2005

Store - 104 - Deer Park

| | Selling Labor | | Compliance | STAR | | Conversion | | Sales Impact |
|---|---|---|---|---|---|---|---|---|
| | Rec. | Actual | | Rec. | Actual | Rec. | Actual | |
| 07:00 | 2 | 4.05 | 49% | 0 | 0 | N/A | 0% | N/A |
| 08:00 | 8.5 | 5.4 | 64% | 7.5 | 11.9 | 15% | 14.1% | ($16.45) |
| 09:00 | 9.5 | 5.4 | 57% | 11.4 | 20 | 19.5% | 17.6% | ($76.86) |
| 10:00 | 11.5 | 8.1 | 70% | 11.7 | 16.7 | 27% | 25.9% | ($61.60) |
| 11:00 | 14 | 9.45 | 68% | 11.1 | 16.5 | 28.1% | 26.9% | ($78.88) |
| 12:00 | 15.5 | 14.85 | 96% | 11 | 11.5 | 27.6% | 27.5% | ($9.88) |
| 13:00 | 18 | 17.55 | 98% | 11.9 | 12.3 | 25.2% | 25.1% | ($6.98) |
| 14:00 | 17 | 17.55 | 97% | 16.5 | 16 | 29.8% | 29.9% | $18.23 |
| 15:00 | 17 | 14.85 | 87% | 16.5 | 18.9 | 18.7% | 18.1% | ($65.28) |
| 16:00 | 17 | 13.5 | 79% | 14.6 | 18.4 | 20.6% | 19.8% | ($183.61) |
| 17:00 | 17 | 14.85 | 87% | 12.2 | 13.9 | 34.2% | 33.8% | ($37.32) |
| 18:00 | 10.5 | 12.15 | 86% | 19 | 16.4 | 24% | 24.6% | ($50.69) |
| 19:00 | 11 | 12.15 | 91% | 12.4 | 11.2 | 29.1% | 29.4% | $18.19 |
| 20:00 | 6 | 10.8 | 56% | 21.3 | 11.9 | 15.8% | 18% | $118.19 |
| 21:00 | 2 | 8.1 | 25% | 37.5 | 9.3 | 37.7% | 44% | $235.55 |
| Total | 176.5 | 168.75 | 96% | 13.6 | 14.2 | 25.8% | 25.7% | ($167.92) |

FIG. 12

ShopperTrak

Performance
Selling
Staffing
Weekly
Yesterday
Week to Date
Month to Date
Other Period
Scheduling
Power Hours
Administration
My Preferences RTA | Support | Admin | ESP        Log out | Help Dave Mcneill-Demo Company        ShopperTrak Staffing Performance - Other Period Store - 104 - Deer Park Beginning Date: 12/10/2005  Ending Date: 12/10/2005
Period Level: 104-Deer Park

| | Selling Labor | | Compliance | STAR | | Conversion | | Sales Impact |
|---|---|---|---|---|---|---|---|---|
| | Rec. | Actual | | Rec. | Actual | Rec. | Actual | |
| Sun 07/03 | 48 | 34.82 | 72.5% | 15.5 | 21.4 | 24.4% | 23.1% | ($441.20) |
| Mon 07/04 | 32.5 | 35.95 | 90.4% | 15.6 | 14.1 | 19.4% | 19.8% | $80.33 |
| Tue 07/05 | 34 | 34.72 | 97.9% | 15.5 | 15.1 | 22.6% | 22.6% | $13.00 |
| Wed 07/06 | 32.5 | 45.94 | 70.7% | 15.2 | 10.7 | 16.5% | 17.4% | $174.16 |
| Thu 07/07 | 35.5 | 69.8 | 50.9% | 16.7 | 8.5 | 15% | 16.9% | $510.01 |
| Fri 07/08 | 36.5 | 17.85 | 48.9% | 17.7 | 36.1 | 29.4% | 25.3% | ($704.25) |
| Sat 07/09 | 62 | 39.57 | 63.8% | 16 | 25.1 | 25.3% | 23.2% | ($1,005.10) |
| Total | 281 | 278.65 | 69.1% | 16.1 | 19.9 | 22.4% | 21.6% | ($1,373.05) |

104-Deer Park  Go

Need help with this page? CLICK HERE.   Privacy Policy| Terms of Use    Powered by ShopperTrak

FIG. 13

ShopperTrak

| RTA | Support | Admin | ESP |

Dave Mcneill–Demo Company     Log out | Help

ShopperTrak

/Performance/
Selling
Last Week
Yesterday
Week to Date
Month to Date
Other Period
Staffing
Scheduling
Power Hours
Administration
My Preferences Store - 104 - Deer Park Selling Performance - Week to Date

| Day | Traffic ~50 | Conv. Rate ~40 | Sales ~52 | Avg. Trans. ~54 | STAR ~26 | $ Per Shopper ~56 |
|---|---|---|---|---|---|---|
| Sun 11/27 | 988 | 19.5% | $13,058.41 | $67.66 | 12.4 | $13.22 |
| Mon 11/28 | 492 | 24.6% | $7,196.37 | $59.47 | 11.9 | $14.63 |
| Tue 11/29 | 507 | 23.9% | $5,995.62 | $49.55 | 23.9 | $11.83 |
| Wed 11/30 | 515 | 18.6% | $6,438.48 | $67.07 | 13.4 | $12.50 |
| WTD Total | 2502 | 21.2% | $32,688.88 | $61.56 | 13.8 | $13.07 |

104-Deer Park ≫ Go

~36

? Need help with this page? CLICK HERE.  Privacy Policy | Terms of Use ~38  Powered by ShopperTrak

FIG. 14

TRAFFIC BASED LABOR ALLOCATION METHOD AND SYSTEM

BACKGROUND

1. Field of the Invention

The present invention generally relates to the field of labor or workforce management, and more specifically to a computerized method for determining the distribution of traffic and providing labor scheduling recommendations based on foot traffic information for facilities such as retail stores, malls, casinos, or the like.

2. Related Prior Art

Traditionally, labor staffing was performed manually by the management of businesses. The invention of computer technology facilitated the labor staffing process by allowing humans to use computer programs. More recently, computer methods have been developed to determine improved workforce schedules. Examples include Gary M. Thompson (A Simulated-Annealing Heuristic For Shift Scheduling Using Non-continuously Available Employees, Computer Ops. Res. Vol. 23, No. 3, pp 275-288, 1996) and U.S. Pat. No. 6,823,315.

Gary M. Thompson described a method of labor scheduling using a simulated annealing process, which heuristically compares a trial schedule from an incumbent schedule. U.S. Pat. No. 6,823,315 is directed to a cost-effective workforce scheduling system, which takes into consideration workforce requirements including employee preferences and job skills in addition to using a simulated annealing function.

An essential problem for labor scheduling is to accurately predict staffing needs for stores. Stores tend to have varied foot traffic during different seasons. For example, the period between Thanksgiving and Christmas is usually very busy and thus more traffic is expected. On the other hand, a Tuesday afternoon in a month with no national holiday may expect less traffic than normally observed. Therefore, foot traffic for a given store is an important factor for predicting store sales and staffing needs for that given store. Previous scheduling approaches have not come to realize the importance of store traffic and often used other data, such as historical store sales, as the main factor for predicting future store sales and labor demands. However, historical store sales information may not be a good indication of potential sales, because being short handed at busy seasons is likely to have a negative impact on sales. Using old sales data to predict future sales is likely to suffer from repetitive mistakes.

Meanwhile, store traffic is a better representation of staffing demands and is perhaps the most accurate leading indicator for future sales. Research shows that, for example, a steady decline in store traffic indicates that sales will similarly decline within approximately 13 months. Therefore, if a store only sees that sales are steady but is unaware that the store traffic has declined, that store won't be prepared to take corrective action before facing a future loss in sales. Each shopper that walks through the door represents a sales opportunity. Syncing store labor to foot traffic and conversion rate does not require the retailers to spend more; rather it will allow more efficient management of labor. No prior invention has developed a labor scheduling method using traffic data as the leading input for predicting labor demands and recommendations.

Thus, it is a primary objective of this invention to provide a computerized labor scheduling method using traffic information.

SUMMARY OF THE INVENTION

The invention relates to a staffing planning method for distributing store traffic forecast across a day and providing weekly staffing recommendations. In one form of the invention, employees are scheduled at ½ or 1 hour intervals. In order to predict the traffic distribution at ½ or 1 hour intervals across a day, baseline days are selected from an historical traffic distribution database and used as references to compute the traffic distribution for a future date. The method computes the average share of foot traffic in the store at each ½ or 1 hour interval for the baseline days. The shares of foot traffic are used for calculating daily foot traffic distribution for the given date. Staffing recommendations for a targeted period are computed by distributing labor as a linear function of the foot traffic and are also subject to user-defined guidelines. The staffing recommendations are computed for each ½ or 1 hour interval of the targeted period and are expected to provide staffing forecasts as many as 16 weeks forward.

The staffing planning method has four inputs: historical traffic forecast, user-defined store hours, user-defined minimum and maximum coverage, and one method of distribution. The user can choose between two methods of distribution: (1) distributing labor using a fixed number as the total number of payroll hours to be arranged in a given period; or (2) distributing labor using a targeted shopper-to-associate ratio without a fixed number of hours.

It is an objective of the present invention to provide a simplified, automated, and cost-effective system for staffing recommendations.

It is a further objective of the present invention to help optimize associate performance by re-allocating more labor to the periods of highest traffic without further increase in labor cost.

It is yet another objective of the present invention to provide customized data models for each store and provide traffic projections for as many as 16 weeks in advance.

It is another objective of the present invention to provide a simple user interface that is easy to load and requires little or no maintenance.

It is a further objective of the present invention to provide a user interface with clear and intuitive reporting.

It is another objective of the present invention to incorporate various practical factors (such as store hours, min/max staffing requirements, available payroll hours, holiday and seasonal variations) into the staffing recommendation for a given time period.

It is another objective of the present invention to provide integrated performance measurements to allow the user to assess staffing effectiveness.

It is another objective of the present invention to provide a user with secure access to the system.

In accordance with these and other objectives that will become apparent hereafter, the present invention will be described with particular reference to the accompanying drawings.

BRIEF DESCRIPTION OF THE DRAWINGS

FIG. 6 illustrates the store hours setup in the embodiment of FIG. 1;

FIG. 7 illustrates the Min/Max coverage setup in the embodiment of FIG. 1

FIG. 9 illustrates the recommended staffing results by hour in the embodiment of FIG. 1;

FIG. 12 illustrates the staffing performance result for a given day in the embodiment of FIG. 1;

FIG. 13 illustrates the staffing performance result for a sample time period between Jul. 3, 2005 and Jul. 9, 2005 in the embodiment of FIG. 1; and FIG. 14 illustrates the selling performance result for a given week to date in the embodiment of FIG. 1.

DETAILED DESCRIPTION OF THE INVENTION

This detailed description is presented in terms of programs, data structures or procedures executed on a computer or network of computers. The software programs implemented by the system may be written in languages such as JAVA, C++, C#, Python, PHP, or HTML. However, one of skill in the art will appreciate that other languages may be used instead, or in combination with the foregoing.

Store traffic is represented by foot traffic, which, for a store, is the count of shoppers in the store during a given interval.

Statistically, a distribution is defined as a set of numbers, each number having a frequency of occurrence collected from measurements over a statistical population.

Figure 1:
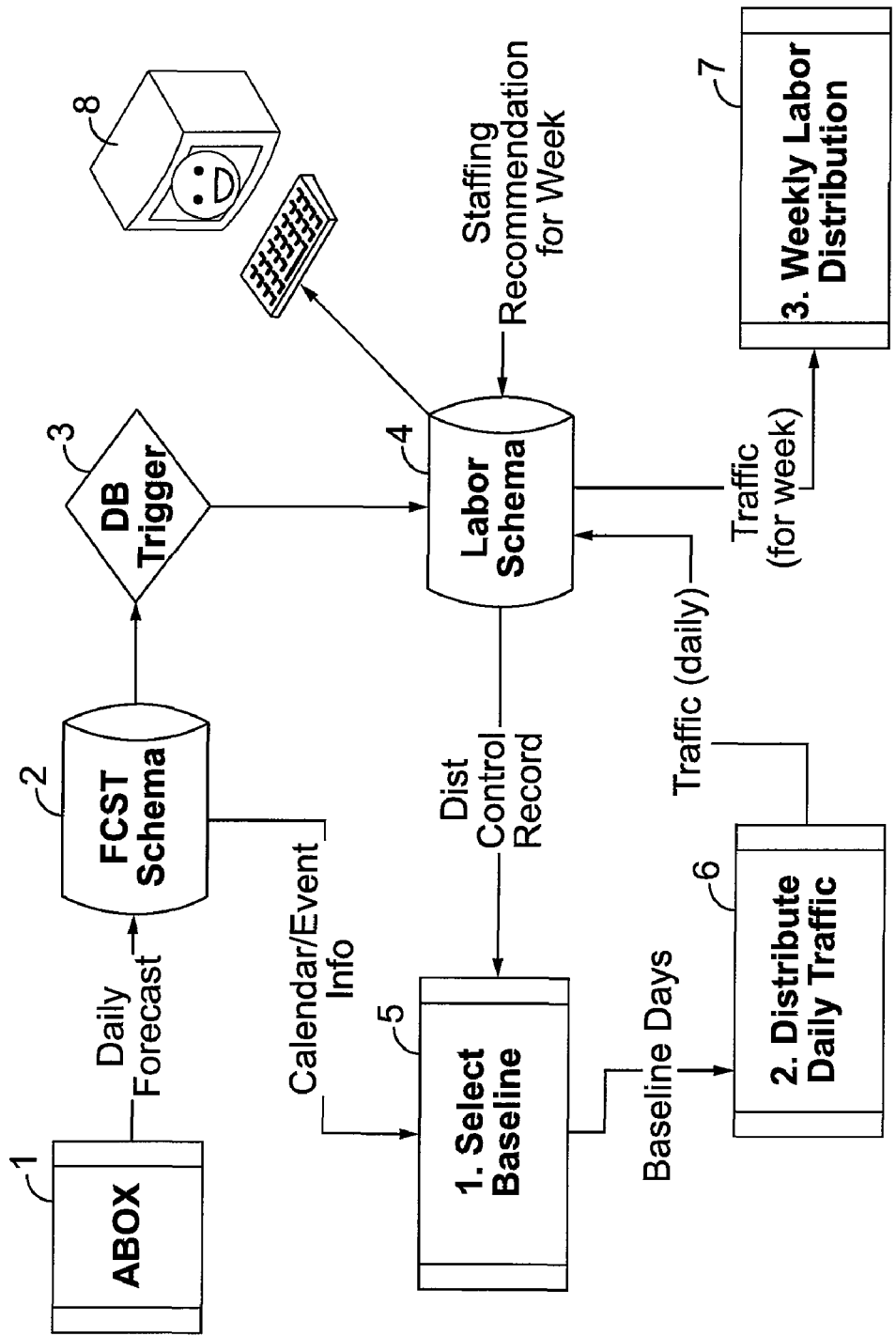
FIG. 1 is a schematic overview of one embodiment of the invention.

FIG. 1 illustrates the system architecture of one embodiment of the invention. Major functions include select baseline 5, distribute daily traffic 6, and weekly labor distribution 7, as will be described.

Figure 2:
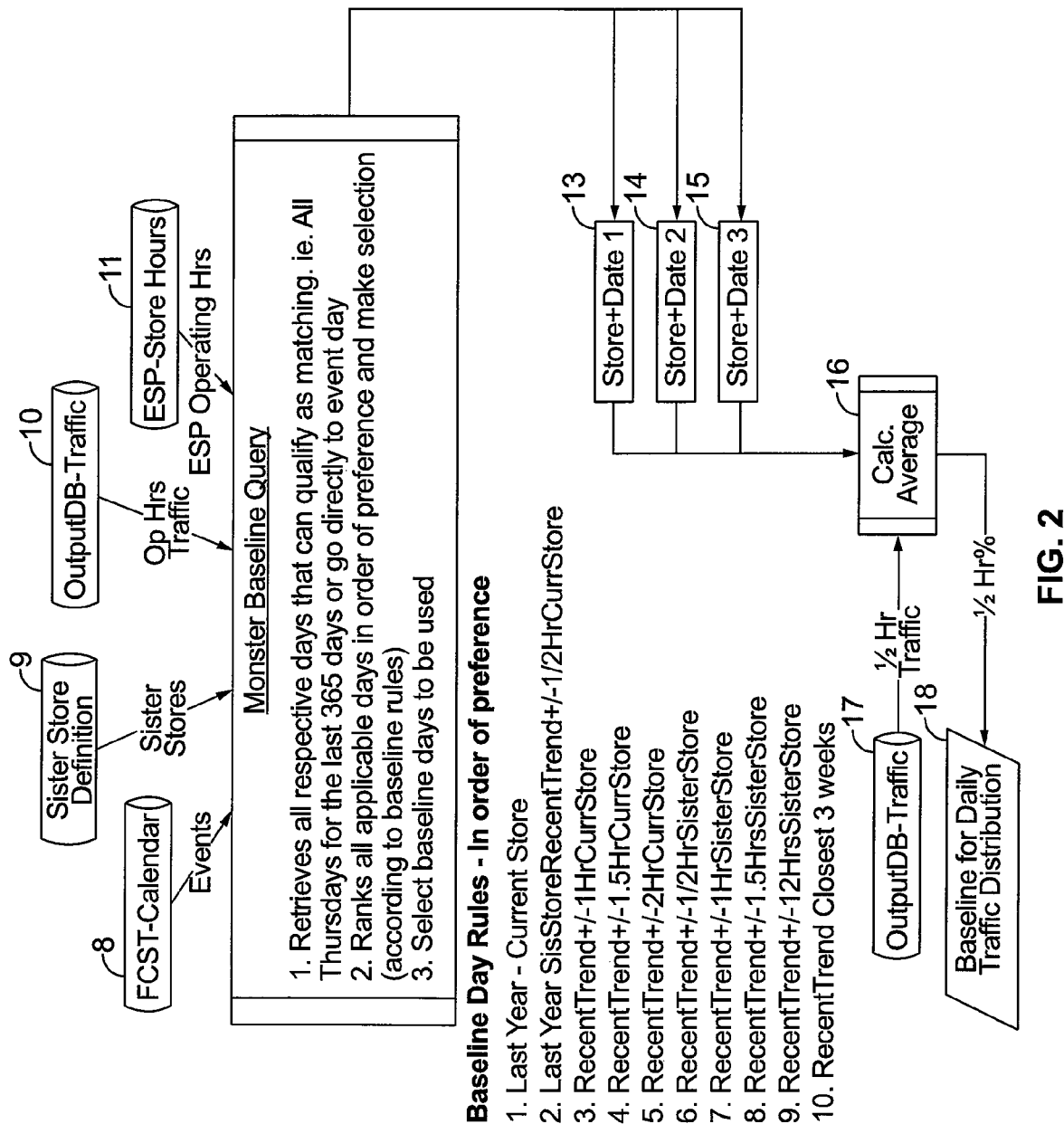
FIG. 2 illustrates the process of selecting a baseline in the embodiment of FIG. 1.

As seen in FIG. 1, AutoBox (ABOX) 1 performs daily store foot traffic forecasts using state of the art statistical algorithms. Traffic forecast data on a day level are stored at the ABOX 1. Another potential source of traffic forecast is from custody data. FCST (Forecast) schema 2 is used to extract calendar/event information from the daily traffic forecast data. The FCST schema 2 can also be triggered by Database Trigger (DB Trigger) 3 to be integrated into labor schema 4. Referring to FIG. 2, the function of select baseline 5 computes baseline days based on inputs such as calendar 8, sister store definition 9, historical traffic information 10, and store hours 11. The baseline days are used as references to distribute daily traffic for a future date at ½ or 1 hour intervals. The daily traffic patterns are stored in the labor schema 4 (FIG. 1) and can be accessed and viewed through a user interface 8. The daily traffic distribution is also used for computing weekly labor distributions 7 and providing labor recommendations at ½ or 1 hour intervals for a given week. The weekly labor distributions 7 are also stored in the labor schema 4 and can be accessed through the user interface 8. The user interface 8 can be a web interface.

Select baseline function 5 is used to identify baseline days within the last year of history that are similar to a targeted future time period. The baseline days can be selected as the same days of those weeks that have the closest open/close times as the targeted time period. For example, if the targeted time period is a Thursday, the baseline days can be selected as the last 3 Thursdays within the last 365 days that have similar open/close times. For the holiday period, the baseline days are usually selected to be the same dates in the last year, which gives more reliable indication of traffic distribution.

As seen in FIG. 2, selecting a baseline involves both user-defined setup/configuration and system processing. The setup/configuration defined by the user includes: (1) store hours 11, i.e., daily operational hours for a given store; (2) holiday or event information from the calendar 8; and (3) historical traffic information from OutputDB 10. If there is not enough historical traffic information accumulated for a given store, sister store information 9 will also be used to obtain the baseline. After the setup/configuration is decided, records of all days that qualify as matching days to the targeted time period are retrieved from the database. For example, all Thursdays for the last 365 days may be retrieved when the user is trying to schedule a Thursday. The retrieved matching days are then ranked in the order of preference (such as the degree of similarity) according to baseline rules, and a certain number of days are selected to be the baseline days. An example of baseline rules is shown in the order of preference in FIG. 2. The average value 16 at each ½ or 1 hour interval for the selected baseline days is computed and used as the baseline 18 for daily traffic distribution.

Figure 3:
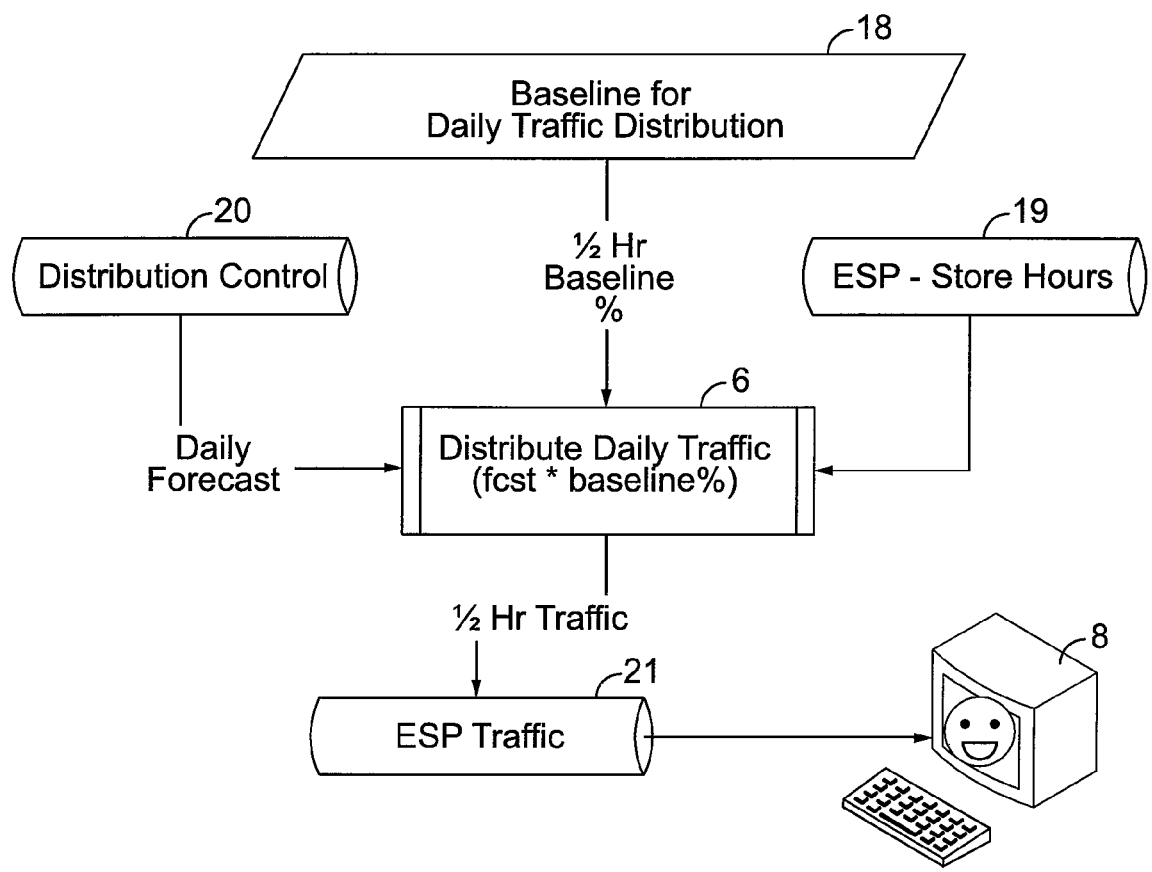
FIG. 3 illustrates the process of distributing daily traffic in the embodiment of FIG. 1.

As seen in FIG. 3, once the baseline 18 for daily traffic distribution is computed, the daily traffic can be distributed by using daily forecast data from distributed control 20, store hours 19, and baseline percentage for each ½ or 1 hour interval of each targeted day. The traffic distribution for each ½ or 1 hour interval is calculated as the product of the daily traffic forecast from distributed control 20 and the baseline percentage of that interval from the baseline 18. The result of the distribution can be accessed and viewed from the user interface 8.

Figure 4:
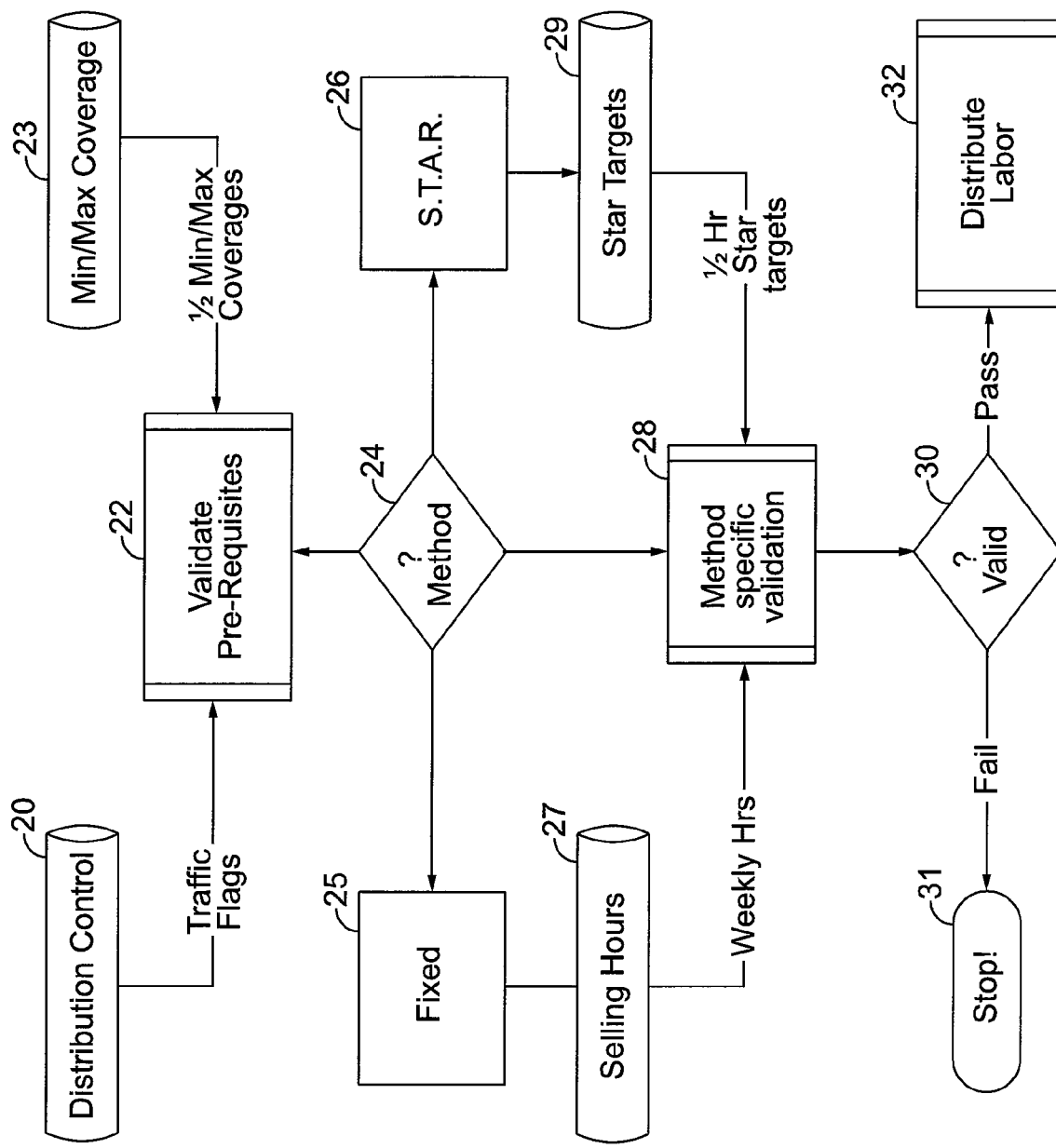
FIG. 4 illustrates the validation phase of distributing weekly labor in the embodiment of FIG. 1.

As seen in FIG. 4, in addition to the daily traffic distribution, weekly labor distribution 32 can be computed for a given week. The computation of weekly labor distribution 32 requires two inputs as pre-requisites: (1) traffic flags from distribution control 20; and (2) Min/Max coverage 23 at ½ or 1 hour intervals. If any of the required inputs are not valid or are missing, the weekly labor distribution cannot be performed and the user will be communicated through user interface 8 of the missing or invalid inputs. After the pre-requisites are validated 22, the user may choose either Fixed method 25 or STAR™ method 26 as the distribution method.

The Fixed method 25 uses a user-defined total number of employee hours available for selling for a given week to compute the labor distribution. In comparison, the STAR™ method 26 does not require a fixed number of selling hours, but instead uses a Shopper-To-Associate Ratio (STAR) at ½ or 1 hour intervals for staffing computation.

The STAR 26 is computed as the amount of foot traffic in a store divided by the number of store employees on duty at a given interval. By studying trends in hourly and daily store traffic reports, district and store managers can identify an optimal STAR 26 value for a given store without overstaffing the store with unnecessary labor. Once the optimal STAR value is identified, scheduling additional personnel above the optimal STAR value will result in diminished returns on the retailer's labor investment, while scheduling below the optimal STAR value will result in insufficient employees on duty during peak selling hours or days, which may lead to lower service quality and lost sales. The optimal STAR value is sometimes referred to as STAR target 29. As seen in FIG. 4, STAR targets 29 at each ½ hour intervals are used to compute labor distribution in the illustrated embodiment.

If the Fixed method 25 is chosen, the user is required to enter the total number of selling hours 27 available for the targeted week. If the STAR method 26 is chosen, the user is required to enter STAR targets 29 at ½ or 1 hour intervals for the targeted week. If the chosen method and method-specific inputs pass validation test 30, the weekly labor distribution is performed 32. Failure to pass validation test 30 will not generate weekly labor distribution results.

Figure 5:
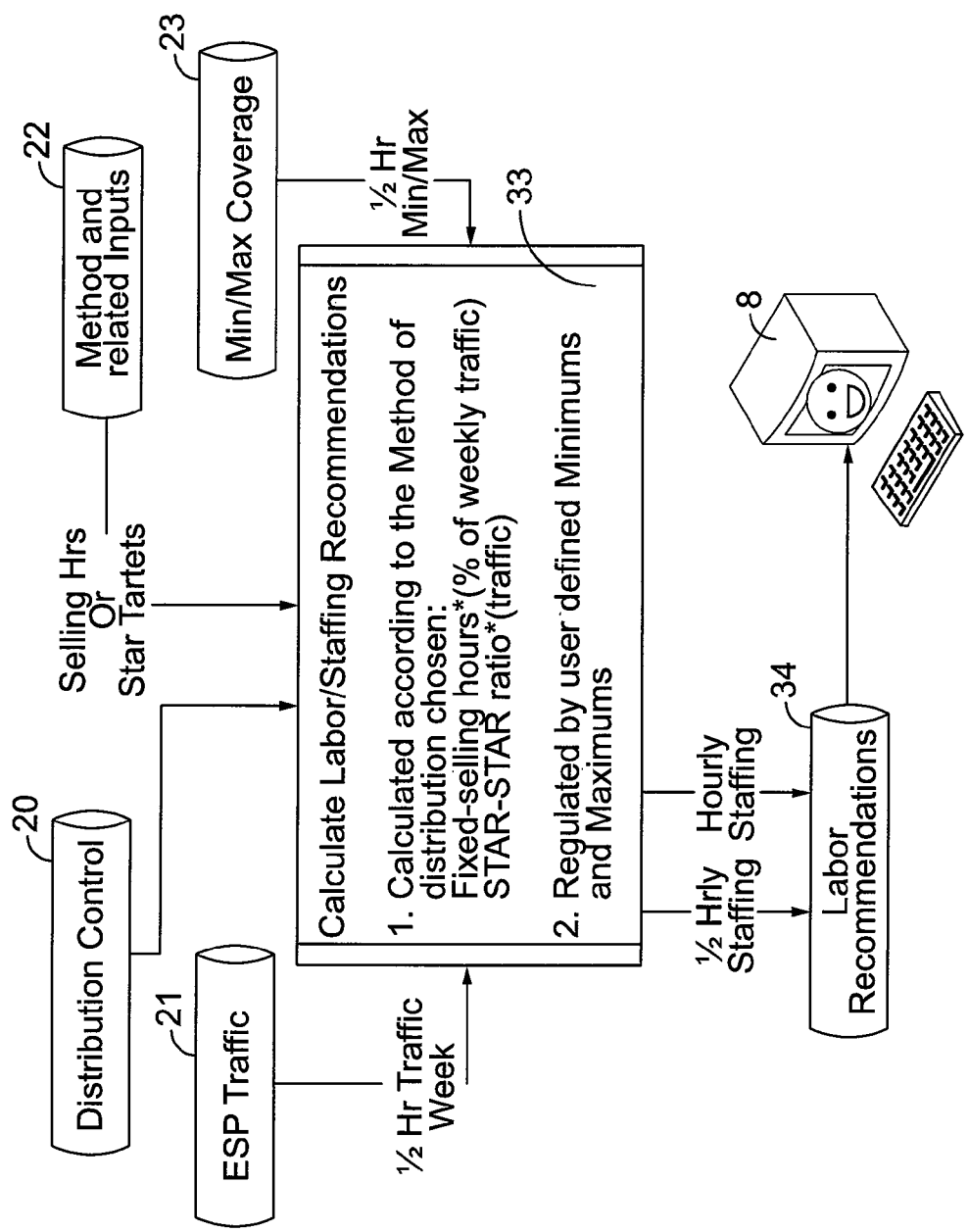
FIG. 5 illustrates the process of distributing labor and providing staffing recommendations in the embodiment of FIG. 1.

As seen in FIG. 5, labor recommendations 33 are computed in two steps: (1) Using one of the two methods of distribution (the Fixed method 25 or the STAR method 26) to calculate\labor recommendations 34 at ½ or 1 hour intervals during operating hours of each day within the targeted time period; and (2) regulating the recommendations by user-defined minimum coverage 24 and maximum coverage 26. Input to the minimum coverage 24 indicates the minimum number of employees allowed in the given store. Similarly, input to the maximum coverage 26 indicates the maximum number of employees allowed in the given store. Results of the labor recommendations 34 can be accessed and viewed through the user interface 8.

FIGS. 6-14 are screenshots of an online demonstration of the present invention. Each screenshot of the demonstration has a menu 36 on the left hand side and a data frame 38 on the right hand side of the page. The menu 36 allows the user to select the data frame 38 he or she wants to view.

Figure 6:
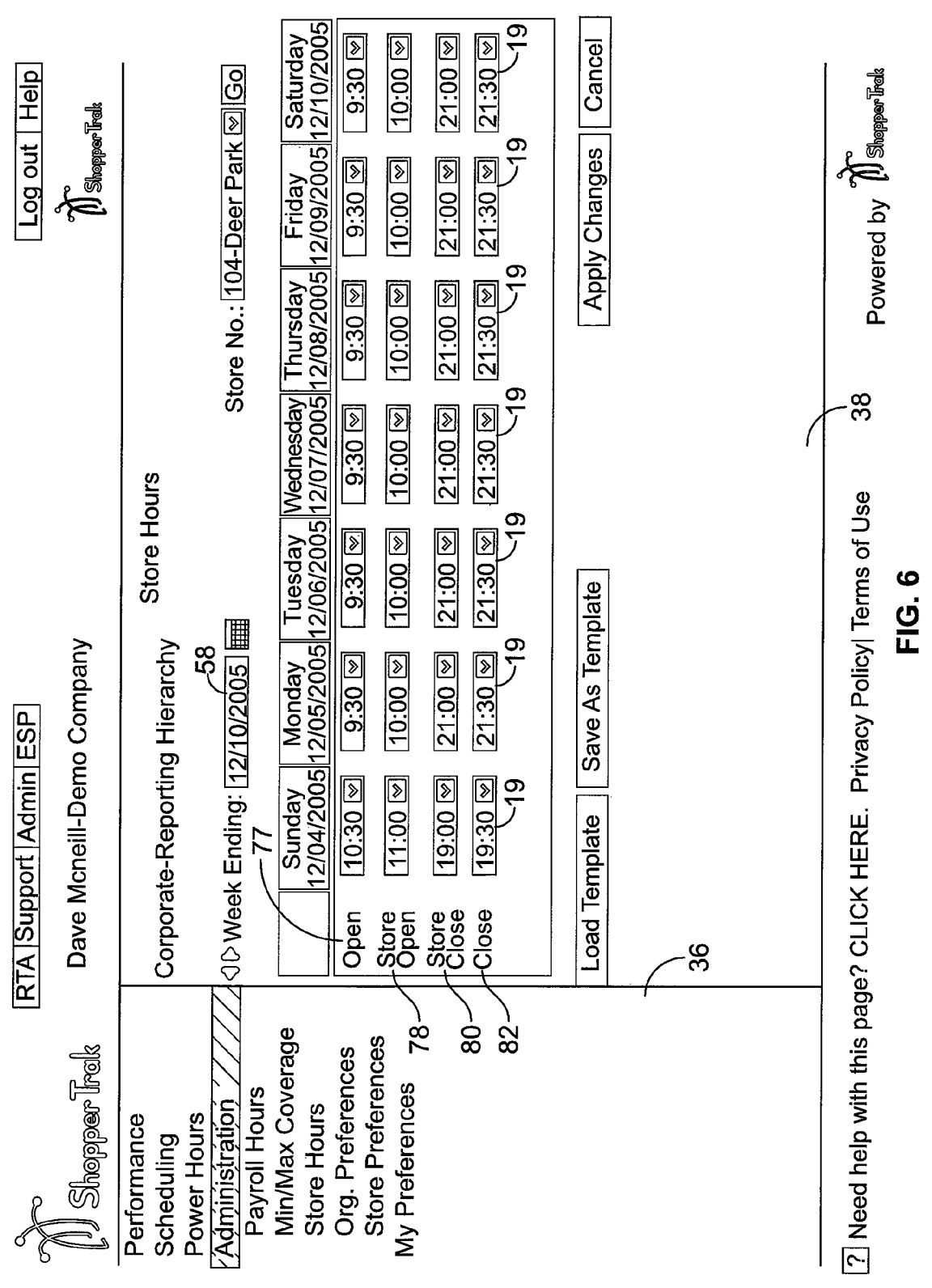

As seen in FIG. 6, the user is prompted to enter or update the store hours for a given week at a given store by selecting from the menu 36 under the "administration" category and the "store hours" sub-category. For each day within the given week, the user specifies four fields: "open" 76, "store open" 78, "store close" 80, and "close" 82. Input to the "open" 76 text field indicates the time when employees start working at the store. Input to the "store open" 78 text field indicates the time when the store is open for shoppers. Similarly, inputs to the "store close" 80 and "close" 82 fields indicate the time when the store is closed for shoppers and employees respectively. The user can choose to load a template of store hours into the given store, or to input the hours manually and save the changes.

As seen in FIG. 7, the user is prompted to enter or update the min/max coverage for a given week at a given store by selecting from the menu 36 under the "administration" category and the "min/max coverage" sub-category. For each half-hour on each day within the given week, the user specifies two fields: minimum coverage 24 and maximum coverage 18. The user can choose to load a template of min/max coverage into the given store, or to input the numbers manually and save the changes.

Figure 8:
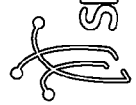
FIG. 8 illustrates the payroll hours setup in the embodiment of FIG. 1.

As seen in FIG. 8, the user is prompted to enter or update the payroll hours for a given week for a list of stores by selecting from the menu 36 under the "administration" category and the "payroll hours" sub-category. The user specifies the selling hours 27 and the non-selling hours 28 for each store for the given week. The user may also specify the sales forecast 29 for each listed store. The selling hours 27 indicates the number of employee hours available at a given store during the time the store is open for shoppers, while the non-selling hours 28 indicates the number of employee hours available at the given store during the time the store will be open for employees but not shoppers.

As seen in FIG. 9, the user can view the recommended staffing at ½ or 1 hour intervals for each day within a given time period (such as "this week") at each store by selecting from the menu 36 under the "administration" category and the "store hours" sub-category. The recommended staffing is given by the number of recommended employees on duty 76 shown in the data frame 38. For example, the recommended staffing number for 18:00 on Monday Nov. 8, 2005 is 3. Numbers 76 that are beyond a certain threshold are shaded and should be the focus of the store managers because they indicate periods of heavy store traffic. Sales forecast 70 for the given time period, available selling hours 72, and available non-selling hours 74 are also displayed in the same data frame 38.

Figure 10:
FIG. 10 illustrates the power hours traffic forecast result in the embodiment of FIG. 1.

As seen in FIG. 10, the user can view the power hours traffic forecast at ½ or 1 hour intervals for each day within a given period of time (such as "this week") at each store by selecting from the menu 36 under the "power hours" category. The power hours traffic forecast for each hour or half-hour for each day within the given week are given in the data frame 38. Power hours beyond a certain threshold are shaded and those shaded power hours should be the focus of management. For example, the management can decide to avoid sending associates on breaks or lunches during these periods.

Figure 11:
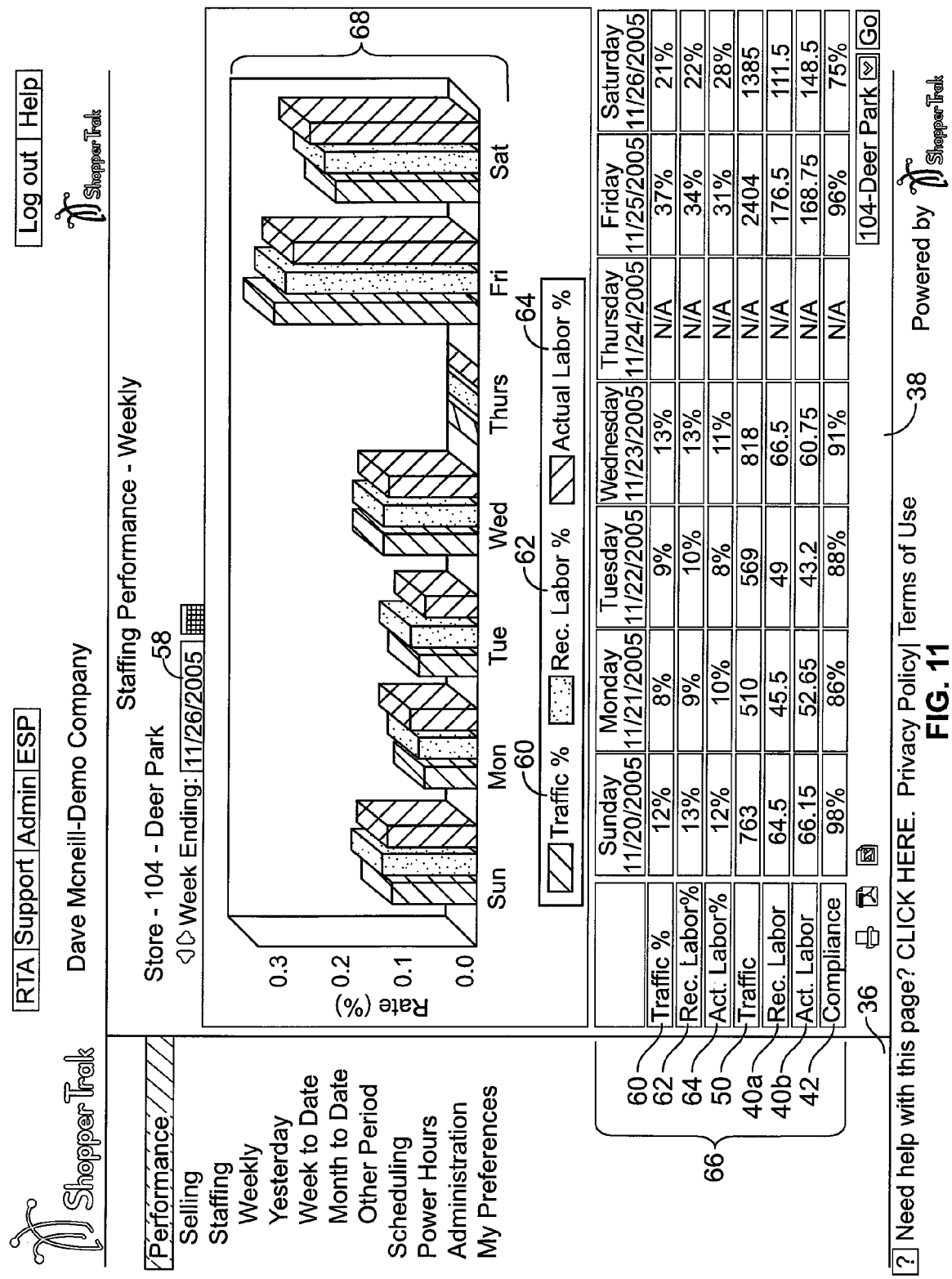
FIG. 11 illustrates the staffing performance result for a given week in the embodiment of FIG. 1.

As seen in FIG. 11, the user can view the staffing performance for a given week for each store by selecting from the menu 36 under the "staffing" category and inputting the week ending date 58 in the corresponding text field in the data frame 38. The data frame 38 shows for each day within that week the store foot traffic 50, the recommended selling labor 40a, the actual selling labor 40b, the compliance 42, the traffic percentage (percentage of traffic occurred in that day over the given week) 60, the recommended labor percentage (the percentage of recommended labor occurred in that day over the given week) 62, and the actual labor percentage 64 (the percentage of actual labor occurred in that day over the given week). In additional to viewing the numerical data displayed in table 66, the user can view the staffing performance comparison in a bar chart 68 in the same data frame 38. The bar chart 68 visualizes the results of the traffic percentage 62, the recommended labor percentage 62, and the actual labor percentage 64. As seen in FIG. 11 and from many other tests, the recommended labor percentage 62 tends to be closer to the store foot traffic measured on the spot than the actual labor percentage 64 used at a given store. This shows that the recommended labor percentage 62 is a good indication of the store traffic and could be used to help a store adjust to achieve its optimal operating performance.

Conversion rate 40 is a retail performance metric computed by comparing a store's foot traffic during a time period to the number of retail transactions occurred during that time period.

As seen in FIG. 12, the user can view the staffing performance for a given day (such as "yesterday") for each store by selecting from the menu 36 under the "staffing" category. The corresponding data frame 38 shows for each store hour during that day the selling labor 40 including recommended selling labor 40a and actual selling labor 40b, the compliance 42, the STAR 26 values including the STAR values computed from recommended staffing 26a and the STAR values computed from actual staffing 26b, and the conversion rates 40 including the conversion rates computed from recommended staffing 40a and the conversion rates computed from actual staffing. Also shown is sale impact 50, which is the cost saved or lost by adopting the recommended staffing instead of the actual staffing. The aggregated result for the specific day is also shown in the same data frame 38.

As seen in FIG. 13, the user can view the staffing performances for a user-defined time period for each store by selecting from the menu 36 under the "staffing" category and inputting the beginning date 44 and the end date 46 of the defined time period in corresponding text fields. The user can also select the period level (such as "day" or "hour") from a drop-down menu 48 in the corresponding data frame 38. The data frame 38 shows the selling labor 40 including recommended selling labor 40a and actual selling labor 40b, the compliance 42, the STAR 26 values including the STAR values computed from recommended staffing 26a and the STAR values computed from actual staffing 26b, the conversion rates 40 including the conversion rates computed from recommended staffing 40a and the conversion rates computed from actual staffing, and the sale impact 50. The aggregated result for the specified time period is also shown in the same data frame 38.

As seen in FIG. 14, the user can review the daily, weekly, or monthly selling performances for each store by selecting from the menu 36 under the "selling" category. The corresponding data frame 38 shows the traffic volume 50, the conversion rate 40, the sales 52, average transactions 54, STAR value 26, and sales per shopper 56 for each day within the given time period and the aggregated result for the given time period.

The invention is not limited by the embodiments disclosed herein and it will be appreciated that numerous modifications and embodiments may be devised by those skilled in the art. Therefore, it is intended that the following claims cover all such embodiments and modifications that fall within the true spirit and scope of the present invention.

What is claimed is:

1. A method of distributing labor based upon determinations of traffic in a retail facility, the method being executed by at least one processor and comprising the steps of:
    (a) obtaining daily traffic forecast information for each day within a given time period;
    (b) determining calendar and event information for each day within the given period;
    (c) selecting baseline days for each day within the given period from historical traffic data and computing via the at least one processor baseline averages and percentages for a predetermined time interval, the historical traffic data includes both the historical traffic data of the retail facility and the historical traffic data of a similar retail facility, wherein:
        for the each day within the given period, the selected baselines days are a plurality of similar weekdays of a predetermined period prior to the given period,
        when a holiday or event date falls on the each day within the given period, the corresponding baselines days are a plurality of similar holiday or event dates selected from a predetermined number of prior years,
        each of the baseline averages is computed as an average value for the predetermined time interval of the baseline days,
        each of the baseline percentages is computed as a portion of the baseline averages for the predetermined time interval compared to the total number of the baseline averages, and
        the baseline days comprise days included in certain of the selected data that is preferentially ranked;
    (d) determining the distribution of traffic for each day within the given period at each time interval using the baseline percentages for each time interval, and multiplying a value for the baseline percentages by a value for the daily traffic forecast information for the predetermined time interval in each day in the given time period;
    (e) distributing labor data for the given period based on the distribution of traffic for each day within the given period,
    wherein the labor data distribution comprises:
        obtaining minimum and maximum coverage data at the predetermined time interval, assigning for the predetermined time interval the minimum employee coverage, and
        computing remaining available employee hours; and
    (f) providing labor recommendations for each day within the given period based on the preceding steps.

2. The method of claim 1 wherein:
the step of selecting baseline days comprises the step of obtaining setup/configuration data and the step of system processing the setup/configuration data with the historical traffic data of the retail facility and the similar retail facility.

3. The method of claim 2 wherein:
the setup/configuration data includes store hours and the calendar and event information.

4. The method of claim 2 wherein:
the step of selecting baseline days further includes using the setup/configuration data to select data from the historical traffic data of the retail facility and the similar retail facility, and rank the selected data in order of preference, the preference defined by baseline rules.

5. The method of claim 1 wherein the step of distributing labor data comprises the additional steps of:
    (a) obtaining the traffic data;
    (b) validating the steps of obtaining the traffic data and obtaining minimum and maximum coverage data; and
    (c) selecting a labor distribution procedure from among a plurality of labor distribution procedures.

6. The method of claim 5, wherein the plurality of labor distribution procedures includes at least one procedure comprising the steps of:
    inputting the total number of employee hours available for selling in the retail facility; and
    assigning the additional available employee hours to the time interval.

7. The method of claim 5, wherein the plurality of labor distribution procedures includes at least one procedure comprising the steps of:
    inputting data comprising a desired shopper-to-sales associate ratio for the retail facility at each time interval;
    the traffic distribution data divided by the desired shopper-to-associate ratio to produce recommended distribution of labor.

8. The method of claim 6 wherein:
the employee hours assigned to the time interval does not exceed the maximum coverage for the time interval.

9. The method of claim 1, further comprising displaying the results of any of the steps (a) through (f) on an electronic display device.

10. The method of claim 9 wherein:
the electronic display device is at a remote location relative to the retail facility.

11. At least one computer readable medium encoded with computer-executable instructions that, when executed on a computer system, perform a method for distributing labor based upon determinations of traffic in a retail facility, the method comprising the steps of:
    (a) obtaining daily traffic forecast information for each day within a given time period;
    (b) determining calendar and event information for each day within the given period;
    (c) selecting baseline days for each day within the given period from historical traffic data and computing via the at least one processor baseline averages and percentages for a predetermined time interval, historical traffic data includes both the historical traffic data of the retail facility and the historical traffic data of a similar retail facility, wherein;
    for the each day within the given period, the selected baselines days are a plurality of similar weekends of a predetermined period to the given period,
    when a holiday or event date falls on the each day within the given period, the corresponding baselines days are a plurality of similar holiday or event dates selected from a predetermined number of prior years,
    each of the baseline averages is computed as an average value for the predetermined time interval of the baseline days,
    each of the baseline percentages is computed as a portion of the baseline averages for the predetermined time interval compared to the total number of the baseline averages, and
    the baseline days comprise days included in certain of the selected data that is preferentially ranked;
(d) determining the distribution of traffic for each day within the given period at each time interval using the baseline percentages for each time interval, and multiplying a value for the baseline percentages by a value for the daily traffic forecast information for the predetermined time interval in each day in the given time period;
(e) distributing labor data for the given period based on the distribution of traffic for each day within the given period,
    wherein the labor data distribution comprises:
    obtaining minimum and maximum coverage data at the predetermined time interval, assigning for the predetermined time interval the minimum employee coverage, and
    computing remaining available employee hours; and
(f) providing labor recommendations for each day within the given period based on the preceding steps.

12. The at least one computer-readable medium of claim 11, wherein selecting baseline days comprises obtaining setup/configuration data and system processing the setup/configuration data with the historical traffic data of the retail facility and the similar retail facility.

13. The at least one computer-readable medium of claim 12, wherein the setup/configuration data includes store hours and the calendar and event information.

14. The at least one computer-readable medium of claim 12, wherein selecting baseline days further includes using the setup/configuration data to select data from the historical traffic data of the retail facility and the similar retail facility, and rank the selected data in order of preference, the preference defined by baseline rules.

15. The at least one computer-readable medium of claim 11, wherein distributing labor data comprises the additional steps of:
    (a) obtaining the traffic data;
    (b) validating the steps of obtaining the traffic data and obtaining minimum and maximum coverage data; and
    (c) selecting a labor distribution procedure from among a plurality of labor distribution procedures.

16. The at least one computer-readable medium of claim 15, wherein the plurality of labor distribution procedures includes at least one procedure comprising the steps of:
    inputting the total number of employee hours available for selling in the retail facility; and assigning the additional available employee hours to the time interval.

17. The at least one computer-readable medium of claim 15, wherein the plurality of labor distribution procedures includes at least one procedure comprising the steps of:
    inputting data comprising a desired shopper-to-sales associate ratio for the retail facility at each time interval;
    the traffic distribution data divided by the desired shopper-to-associate ratio to produce recommended distribution of labor.

18. The at least one computer-readable medium of claim 16 wherein:
    the employee hours assigned to the time interval does not exceed the maximum coverage for the time interval.

19. The at least one computer-readable medium of claim 11 wherein:
    further comprising displaying the results of any of the steps (a) through (f) on an electronic display device.

20. The at least one computer-readable medium of claim 19 wherein:
    the electronic display device is at a remote location relative to the retail facility.

21. A labor distribution recommendation system based upon determinations of traffic in a retail facility, the system having at least one processor associated with a plurality of programming modules, the system comprising:
    a daily traffic forecast module adapted to receive daily traffic forecast data for each day in a given time period;
    a calendar and event module adapted to extract calendar and event data;
    a selecting baseline module adapted to select baseline days for each day of the given period from historical traffic data and compute via the at least one processor baseline averages and percentages for a predetermined time interval, the historical traffic data includes both the historical traffic data of the retail facility and the historical traffic data of a similar retail facility, wherein:
        for each day within the given period the selected baselines days are a plurality of similar weekdays of a predetermined period prior to the given period,
        wherein when a holiday date falls on the each day within the given period,
        the corresponding baselines days are a plurality of similar holiday dates selected from a predetermined number of prior years,
        each of the baseline averages is computed as an average value for the predetermined time interval of the baseline days,
        each of the baseline percentages is computed as a portion of the baseline averages for the predetermined time interval compared to the total number of the baseline averages, and
        the baseline days comprise days included in certain of the selected data that is preferentially ranked;
    a traffic distribution module adapted to distribute traffic for each day in the given time period at each time interval using the baseline percentages for each time interval, and multiplying a value for the baseline percentages by a value for the daily traffic forecast information for the predetermined time interval in each day in the given time period;
    a labor distribution adapted to distribute labor data for the given time period based on the distribution of traffic for each day within the given time period,
        wherein the labor data distribution comprises:
        obtaining minimum and maximum coverage data at the predetermined time interval, assigning for the predetermined time interval the minimum employee coverage, and
        computing remaining available employee hours;

a recommendation module adapted to provide labor recommendations for the given time period based on the preceding data;

an input device adapted to receive input information related to the given time period and to receive instructions from a user;

an output device adapted to display output data from the traffic distribution module, the labor distribution module, the recommendation module, the calendar and event module, and the daily traffic forecast module; and a database module adapted to store processed data to a database.

22. The labor distribution recommendation system of claim 21, wherein the selecting baseline module is adapted to receive setup/configuration data and process the setup/configuration data with the historical traffic data of the retail facility and the similar retail facility.

23. The labor distribution recommendation system of claim 22, wherein the setup/configuration data includes store hours and the calendar and event information.

24. The labor distribution recommendation system of claim 22, wherein the selecting baseline module is adapted to use the setup/configuration data to select data from the historical traffic data of the retail facility and the similar retail facility, and rank the selected data in order of preference, the preference defined by baseline rules.

25. The labor distribution recommendation system of claim 21, wherein the labor distribution and recommendation module is adapted to:

receive the traffic data;

validate the steps of obtaining the traffic data and obtaining minimum and maximum coverage data; and select a labor distribution procedure from among a plurality of labor distribution procedures.

26. The labor distribution recommendation system of claim 25, wherein the plurality of labor distribution procedures includes at least one procedure adapted to:

obtain the total number of employee hours available for selling in the retail facility; and assign the additional available employee hours to the time interval.

27. The labor distribution recommendation system of claim 25, wherein the plurality of labor distribution procedures includes at least one procedure adapted to:

receive data comprising a desired shopper-to-sales associate ratio for the retail facility at each time interval; and compute recommended distribution of labor as the traffic distribution data divided by the desired shopper-to-associate ratio.

28. The labor distribution recommendation system of claim 26, wherein the employee hours assigned to the time interval does not exceed the maximum coverage for the time interval.

29. The labor distribution recommendation system of claim 21, wherein the input device and the output device are adapted to interact with a user via a browser.

* * * * *